United States Patent [19]

Kniff, deceased

[11] E Re. 29,900

[45] Reissued Feb. 6, 1979

[54] PICK-TYPE MINING BIT WITH SUPPORT BLOCK HAVING ROTATABLE SEAT

[75] Inventor: Thomas B. Kniff, deceased, late of Bedford, Pa., by Servia B. Kniff, executrix

[73] Assignee: Kennametal Inc., Latrobe, Pa.

[21] Appl. No.: 807,026

[22] Filed: Jun. 16, 1977

Related U.S. Patent Documents

Reissue of:

[64] Patent No.: 3,499,685
Issued: Mar. 10, 1970
Appl. No.: 751,094
Filed: Aug., 1968

[51] Int. Cl.[2] ..... E21C 13/02; E21C 35/18

[52] U.S. Cl. ..... 299/86; 175/354; 299/92

[58] Field of Search ..... 299/86, 92, 91; 175/354

[56] References Cited

U.S. PATENT DOCUMENTS

| | | | |
|---|---|---|---|
| 1,582,332 | 4/1926 | Brutus | 175/354 X |
| 1,820,511 | 8/1931 | Van Patten | 175/354 |
| 3,397,012 | 8/1968 | Krekeler | 299/86 |
| 3,498,677 | 3/1970 | Morrow | 299/86 |

*Primary Examiner*—Ernest R. Purser
*Attorney, Agent, or Firm*—Lawrence R. Burns

[57] ABSTRACT

A pick type mining bit with a cylindrical shank has a support block with a bore and a hard insert detachably and rotatably mounted in the bore. The insert has a bore for rotatably receiving the shank of the bit.

The bit has a cylindrical working end projecting from the support block which tapers in at the tip and has a hard insert mounted in the tip.

17 Claims, 2 Drawing Figures

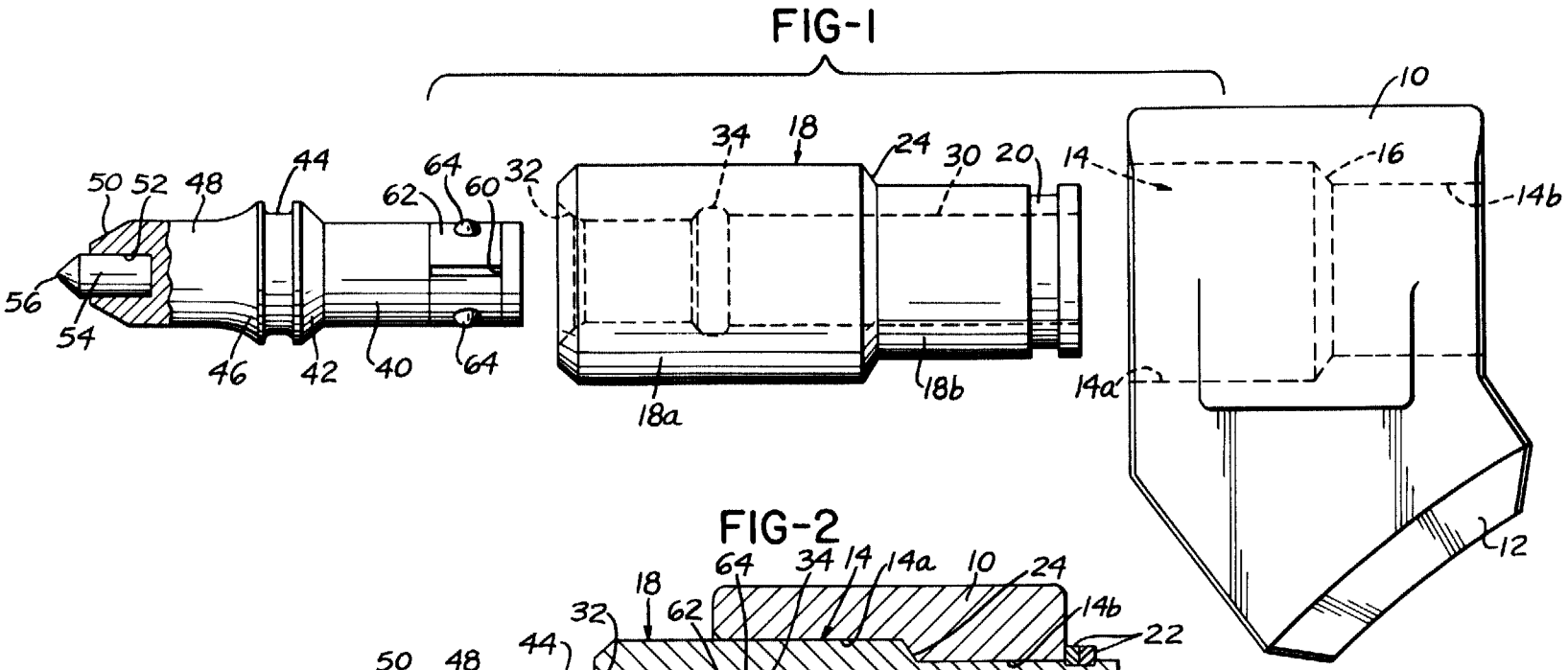
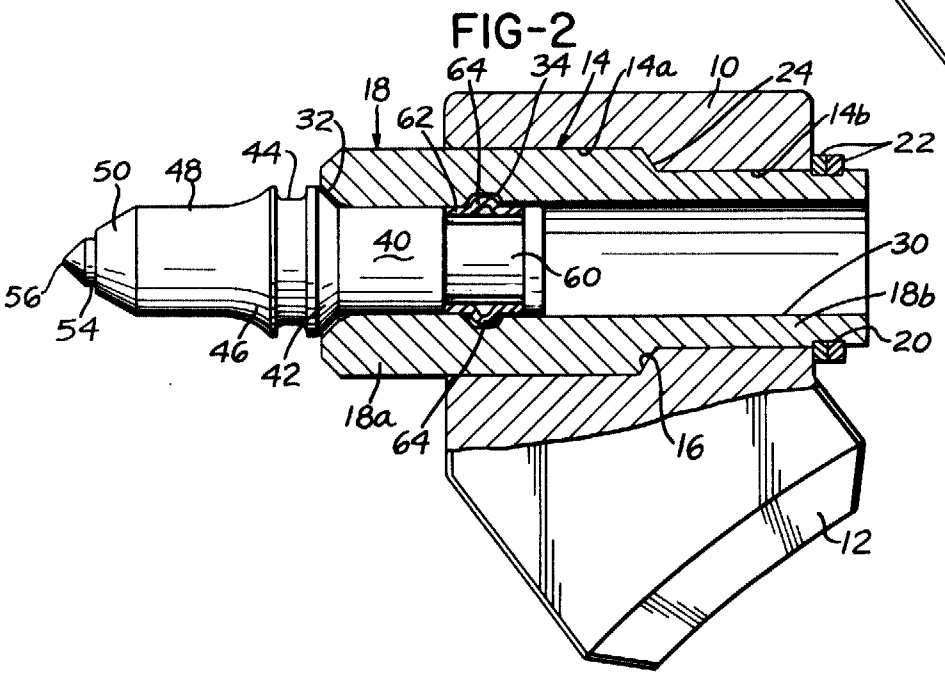
INVENTOR.
THOMAS J. KNIFF
BY
Melvin A. Crosby

PICK-TYPE MINING BIT WITH SUPPORT BLOCK HAVING ROTATABLE SEAT

Matter enclosed in heavy brackets [ ] appears in the original patent but forms no part of this reissue specification; matter printed in italics indicates the additions made by reissue.

*The present application is an application for reissue of U.S. Pat. No. 3,499,685, issued Mar. 10, 1970.*

This invention relates to mining tools, particularly to pick type bits for use with mining machines and to a support arrangement therefor.

Pick type mining bits are, of course, well known and, in general, take the form of an elongated body round in cross section and symmetrical about a central axis with a cylindrical supporting shank at one end and with the other end generally tapering inwardly to a point in which is mounted a cemented carbide wear resistant element. Such bits, it has been found, by a proper support thereof, will rotate on their axis when properly supported. The rotation is preferably caused by the engagement of the bit with the work and has the advantage of distributing the wear about the periphery of the bit or by the life of the bit is substantially lengthened while, furthermore, the point end of the bit remains sharp.

The portion of the bit immediate rearwardly of the point is usually conical and as the bit is used and rotates in use, the body of the bit adjacent the hard cemented carbide insert wears away so that the carbide insert remains exposed. A bit of this nature has the disadvantage that as the point end of the bit wears away in use, the area of the body surrounding the carbide insert increases and this places a greater work load on the machine driving the bit and can also interfere with maintaining the proper exposure of the carbide insert.

In connection with the rotation of the bit in the holder, the bit and holder comprise cooperating inclined or conical shoulder areas, and these shoulder areas are subjected to substantial loads as the bit is used. Because of the loads involved, the shoulders sometimes wear relatively rapidly. With the bit itself, relatively rapid wear of the shoulder is not particularly important because, at worst, it will not wear away nearly as rapidly as the working point end thereof. The support for the bit, however, is in the form of a block which is usually welded in place on the drive machine and rapid wear of the shoulder on the block is a serious problem because the block is normally expected to remain in good condition for the life of several bits.

With the foregoing in mind, it is a primary object of the present invention to provide a pick type mining bit and a support block therefor which overcomes the disadvantages referred to above.

Another object of this invention is the provision of a pick type mining bit having improved operating characteristics.

Still another object of this invention is the provision of a supporting arrangement for a rotatable pick type mining bit in which the wear of the supporting arrangement is maintained at a minimum.

The foregoing objects, as well as still other objects and advantages of the present invention, will become more apparent upon reference to the following detailed specification taken in connection with the accompanying drawings in which:

FIG. 1 is an exploded side elevational view showing a bit arrangement and support therefor according to the present invention, and FIG. 2 is a view partly in section looking at the bit and supporting arrangement from the side and showing the bit assembled with the supporting arrangement.

Referring to the drawings somewhat more in detail, in FIGS. 1 and 2 it will be seen that the arrangement comprises a support block 10, which may be a forging, and which is adapted for being secured to a support member as by welding. It will be noted that the block 10 comprises a curved lower portion 12 which adapts the block for welding to the surface of a drum or the like, but it will be understood that the block could be shaped for mounting on a chain length or any other suitable supporting and driving device.

Block 10 has a shoulder bore 14 extending therethrough with a larger forward portion 14a and a smaller rearward portion 14b which are interconnected by a forwardly facing inclined seat region 16. Seated in bore 14 is a hardened metal sleeve 18 comprising a larger forward portion 18a which rotatably fits in bore portion 14a, and a smaller diameter rearward portion 18b which rotatably fits in bore portion 14b. Portion 18b extends out the back of the block and has a groove 20 therein in which snap rings 22 are mounted.

Joining portions 18a and 18b is an inclined region 24 which fits against inclined region 16 of bore 14. The arrangement is such that sleeve 18 is held in block 10 with a slight degree only of freedom of axial movement therein so that the sleeve is relatively freely rotatable in the block.

Sleeve 18 has a central bore 30 which at the forward end has a flared out seat 32. Spaced rearwardly from seat 32 in bore 30 in an annular recess or undercut or groove 34.

The arrangement described above is the support for the bit to be described and is characterized in the sleeve 18 which reduces the wear on the block and which is itself readily replaceable when excessive wear thereof occurs.

Referring now to the bit, this will be seen to comprise a rearward cylindrical shank 40 having at its one end a flared out seat region 32 adapted for engagement with seat region [32] *42* at the forward end of bore 30. *These flared out seat regions form cooperating elements of abutment means between the bit and sleeve 18.* Following seat region 42, the bit body has an annular groove 44 therein which is for the purpose of receiving a tool for removing the bit from the support when it is to be changed. Forwardly of groove 44 the bit body tapers inwardly rapidly as shown at 46 and then has a substantially cylindrical region 48 which may be of about the same diameter as shank 40. Near the forward end of the bit, there is a frusto-conical portion 50. An axial bore 52 is provided extending inwardly into the frusto-conical end of the bit and seated in bore 52 and preferably retained therein by brazing is a tip element 54 of a hard material, preferably cemented tungsten carbide. Tip element 54 has a pointed end 56 which is a substantial continuation of the inclined wall of frusto-conical portion 50.

Shank portion 40 has an annular groove 60 formed therein in which is seated a split spring band 62 having dimples or protuberances 64 therein distributed about the periphery therefo. The groove 60 and the protuberances 64 are so located along the shank 40 that when the bit is pressed into bore 30 into its FIG. 2 position, the said protuberances 64 will snap into annular groove 34 in bore 30 so as to retain the bit in assembled relation with sleeve 18. The resilient keeper arrangement is illustrated in the copending Engle, et al., application Ser. No. 479,094 filed Aug. 12, 1965, and assigned to the same assignee as the present application. The keeper in the form of a spring band 62 will yield inwardly in groove 60 so as to permit the bit to be pushed into bore 30 and will then snap outwardly when the bit is completely seated in the bore. The keeper firmly retains the bit in sleeve 18 and permits a slight amount of axial movement of the bit in bore 30 so that the bit is not locked against seat region 32 and is freely rotatable in bore 30.

Inasmuch as the bit can rotate in bore 30 and sleeve 18 can rotate in block 10, there will always be rotation of the bit whether this occurs between the bit and sleeve 18 and block 10 or at both places. The possibility of the bit binding and failing to rotate thus becomes remote. Furthermore, the wear on the block is substantially reduced over the wear that takes place on the block which directly supports the bit and in which a bit rotates. It will be appreciated that the bit can be replaced as often as necessary while block 10 will have greatly increased wearing characteristics and will not have to be replaced nearly as often as heretofore has been the case. Rather, the principal wear areas will be on the bit, and sleeve 18 will normally outwear many bits and can itself easily be replaced.

The particular configuration of the bit illustrated herein is of importance because the point end of the bit as it wears and rotates in use will be worn off substantially at the angle of the inclined outer surface of frustoconical portion 50. It will be seen that the bit can wear down until the carbide tip is used up before the diameter of the body material surrounding the tip element commences to increase. The driving machine for the bit will thus not be subjected to increased load as the bit wears and the important characteristic of a pick type bit of removing material by a sort of exploding action is not interfered with and the quality of the material removed by the bit with respect to the content of lines and the particle size, does not change as the bit wears down in use.

What is claimed is:

[1. In combination; a none rotatable support block having a bore, a sleeve of hard wear resistant material rotatably mounted in said bore, first means retaining said sleeve in said bore while permitting rotation of the sleeve in the bore, a pick type bit having a cylindrical shank at one end and tapering in at the other end to a point, said shank being receivable in one end of said sleeve and being rotatable therein, second means detachably retaining said shank in said sleeve while permitting rotation of the shank in the sleeve whereby rotation of said bit can occur during working either with or without rotation of said sleeve, and said sleeve and support block having interengaging shoulders thereon for sustaining axial thrusts imposed on said sleeve by said bit during working operations, the said shoulder on said sleeve facing away from the said one end of the sleeve.]

[2. The combination according to claim 1 wherein said bore in said support block has a larger end part nearest the bit and a smaller end part remote from the bit, and the said shoulder on the block is at the juncture of said parts of said bore, and said sleeve has a larger end part nearest the bit and a smaller end part remote from the bit, rotatably fitting the larger and smaller end parts respectively of said bore, the shoulder on the sleeve being formed at the juncture of the respective end parts thereof.]

3. The combination according to claim [2] *19* in which said shoulders taper outwardly toward the bit end of said sleeve.

4. The combination according to claim 3 in which the smaller end part of said sleeve projects beyond said block and said first means is mounted on the projecting portion of said smaller end part of the sleeve outside said block.

5. The combination according to claim 3 in which said bit comprises a flared seat at the juncture of the shank of the bit with the other end of the bit, said sleeve having a flared region engaged by said seat.

6. The combination according to claim 4 in which said sleeve has an integral groove past which said shank extends when the bit is mounted in the sleeve, and keeper means engaging the shank and groove and releasably retaining the shank in the sleeve.

7. The combination according to claim 6 in which said keeper means is resilient so that the bit can be pried out of the sleeve and forced into the sleeve.

8. The combination according to claim 7 in which said shank has an annular recess and said keeper means is mounted in the recess and is captive on said shank.

9. The combination according to claim 8 in which said keeper means is in the form of a spring band.

*10. The combination according to claim 19 in which said cylindrical shank of said bit is partially axially coextensive with the bore in said support block.*

*11. The combination according to claim 18 in which said shoulders taper outwardly toward the bit end of said sleeve.*

*12. The combination according to claim 11 in which the smaller end part of said sleeve projects beyond said block and said first means is mounted on the projecting portion of said smaller end part of the sleeve outside said block.*

*13. The combination according to claim 11 in which said bit comprises a flared seat at the juncture of the shank of the bit with the other end of the bit, said sleeve having a flared region engaged by said seat.*

*14. The combination according to claim 12 in which said sleeve has an integral groove past which said shank extends when the bit is mounted in the sleeve, and keeper means engaging the shank and groove and releasably retaining the shank in the sleeve.*

*15. The combination according to claim 14 in which said keeper means is resilient so that the bit can be pried out of the sleeve and forced into the sleeve.*

*16. The combination according to claim 15 in which said shank has an annular recess and said keeper means is mounted in the recess and is captive on said shank.*

*17. The combination according to claim 16 in which said keeper means is in the form of a spring band.*

*18. In combination: a non-rotatable support block having a bore; a sleeve of hard wear resistant material rotatably mounted in said bore; and a pick type bit having a shank rotatably receivable in one end of said sleeve; first means retaining said sleeve in said bore while permitting rotation of the sleeve in the bore; and second means detachably retaining said shank in said sleeve while permitting rotation of the shank in the sleeve so that rotation can occur both with and without rotation of said sleeve; said bore having a larger end part nearest the bit and a smaller end part remote from the bit; and a shoulder formed on the*

*block at the juncture of said parts of said bore; said sleeve having a larger end part nearest the bit and a smaller end part remote from the bit and a shoulder, facing away from said one end of said sleeve, formed at the juncture of the respective end parts of the sleeve; said sleeve rotatably fitting the larger and smaller end parts respectively of said bore; said bit having a cylindrical shank at one end and tapering in at the other end to a point with said shank in said sleeve being partially axially coextensive with said bore in said support block; cooperating elements of abutment means between said sleeve and said bit; and said shoulders on said sleeve and said support block interengaging one another for sustaining axial thrusts imposed on said sleeve by said bit during working operations.*

*19. In combination: a non-rotatable support block having a bore; a sleeve of hard wear resistant material rotatably mounted in said bore; and a pick type bit having a shank rotatably receivable in one end of said sleeve; first means retaining said sleeve in said bore while permitting rotation of the sleeve in the bore; and second means detachably retaining said shank in said sleeve while permitting rotation of the shank in the sleeve so that rotation can occur both with and without rotation of said sleeve; said bore having a larger end part nearest the bit and a smaller end part remote from the bit; and a shoulder formed on the block at the juncture of said parts of said bore; said sleeve having a larger end part nearest the bit and a smaller end part remote from the bit and a shoulder facing away from said one end of said sleeve formed at the juncture of the respective end parts of the sleeve; said sleeve rotatably fitting the larger and smaller end parts respectively of said bore; said bit having a cylindrical shank at one end and tapering in at the other end to a point and said shoulders on said sleeve and said support block interengaging one another for sustaining axial thrusts imposed on said sleeve by said bit during working operations.*

* * * * *